(12) United States Patent
Landoni et al.

(10) Patent No.: US 11,149,210 B2
(45) Date of Patent: Oct. 19, 2021

(54) METHOD FOR THE PHYSICAL SEPARATION OF REFINERY PURGE STREAMS

(71) Applicant: ENI S.P.A., Rome (IT)

(72) Inventors: Alberto Landoni, Rho (IT); Stefania Guidetti, Bergamo (IT); Giuseppe Belmonte, Milan (IT)

(73) Assignee: ENI S.P.A., Rome (IT)

( * ) Notice: Subject to any disclaimer, the term of this patent is extended or adjusted under 35 U.S.C. 154(b) by 116 days.

(21) Appl. No.: 16/498,213

(22) PCT Filed: Mar. 29, 2018

(86) PCT No.: PCT/IB2018/052190
§ 371 (c)(1),
(2) Date: Sep. 26, 2019

(87) PCT Pub. No.: WO2018/178927
PCT Pub. Date: Oct. 4, 2018

(65) Prior Publication Data
US 2020/0354639 A1    Nov. 12, 2020

(30) Foreign Application Priority Data
Mar. 31, 2017  (IT) .................... 102017000035782

(51) Int. Cl.
*C10G 31/06*  (2006.01)
*B01D 17/02*  (2006.01)

(52) U.S. Cl.
CPC ......... *C10G 31/06* (2013.01); *B01D 17/0208* (2013.01); *C10G 2300/1096* (2013.01); *C10G 2300/208* (2013.01)

(58) Field of Classification Search
CPC .............. C10G 31/06; C10G 2300/208; C10G 2300/1096; B01D 17/0208
See application file for complete search history.

(56) References Cited

U.S. PATENT DOCUMENTS

| 4,334,976 A | 6/1982 | Yan et al. |
| 4,383,915 A | 5/1983 | Johnson et al. |

(Continued)

FOREIGN PATENT DOCUMENTS

| CN | 86 1 02355 A | 10/1986 |
| CN | 86102355 | * 6/1992 |
| CN | 101824329 A | 9/2010 |

OTHER PUBLICATIONS

International Search Report dated May 28, 2018 in PCT/IB2018/052190 filed on Mar. 29, 2018.
(Continued)

*Primary Examiner* — Randy Boyer
*Assistant Examiner* — Juan C Valencia
(74) *Attorney, Agent, or Firm* — Oblon, McClelland, Maier & Neustadt, L.L.P.

(57) ABSTRACT

The present invention relates to a method for the physical separation of solids and asphaltenes with a conversion degree higher than or equal to 90%, present in refinery purge streams. Said method provides for heating a refinery purge stream to a temperature higher than or equal to 185° C. and not exceeding 220° C. and, subsequently, subjecting said heated purge to sedimentation by progressively lowering the temperature in a controlled manner to a minimum temperature of 100° C., without stirring the purge, so as to form a light phase and a heavy phase defined in relation to the density.

7 Claims, 2 Drawing Sheets

(56) References Cited

U.S. PATENT DOCUMENTS

| | | | |
|---|---|---|---|
| 2011/0114541 A1* | 5/2011 | Viguie | B01D 21/2427 |
| | | | 209/173 |
| 2016/0053184 A1 | 2/2016 | Wheeler et al. | |
| 2016/0068760 A1* | 3/2016 | Belmonte | C10C 3/06 |
| | | | 208/108 |

OTHER PUBLICATIONS

Combined Chinese Office Action and Search Report dated Mar. 2, 2021 in Chinese Patent Application No. 2018800234814 (with English translation), 14 pages.

* cited by examiner

METHOD FOR THE PHYSICAL SEPARATION OF REFINERY PURGE STREAMS

The present invention relates to a method for the physical separation of asphaltenes with a conversion degree higher than or equal to 90%, and solids, such as coke and metals, present in refinery purge streams.

The present invention can be applied in the field of the refining of heavy crude oils.

Purge streams coming from hydroconversion processes in slurry phase, with particular preference for the Eni Slurry Technology (EST), can be treated with this method.

In the present patent application, the term "refinery purge streams" refers to streams containing hydrocarbons in slurry phase having a boiling point higher than or equal to 140° C., said stream being characterized by the presence of quantities of asphaltenes higher than or equal to 5% by weight and characterized by the presence of solid contents higher than or equal to 5% by weight.

For the purposes of the present invention, the term "solid" refers to the fraction insoluble in tetrahydrofuran, indicated in the present text with the abbreviation THF-i.

For the purposes of the present invention, the term "asphaltenes" refers to the fraction soluble in tetrahydrofuran, but insoluble in n-pentane.

Asphaltenes are classified on the basis of their insolubility in n-paraffins (typically having from 5 to 7 carbon atoms $C_5$-$C_7$). These compounds are generally composed of polycondensed aromatic nuclei variously branched and joined to each other by means of sulfur bridges or through linear chains. These compounds concentrate heteroatoms (S, N) in their interior, which give them their polar nature. By subjecting a stream rich in asphaltenes to hydroconversion, it can be observed how they modify their own structure, and in fact become smaller (the molecular weight decreases) following hydrogenolysis of the sulfur bridges and cracking of the alkyl side chains. The reduction in the dimensions leads to an increase in the polar and aromatic nature of the same. The higher the degree of condensation, the more insoluble they become. The increase in the polarity and aromaticity leads to a greater tendency towards peptization of the same, which therefore tend to aggregate and precipitate.

The increase in temperature in this case increases the entropy of the system and prevents aggregation. This is the reason why the higher the conversion degree of an asphaltene, the higher the temperature must be for it to become dispersed in the hydrocarbon matrix.

In the present patent application, all the operating conditions indicated in the text should be considered as being preferred conditions even if not expressly declared.

For the purposes of the present invention, the term "comprising" or "including" also comprises the term "consisting in" or "essentially consisting of".

For the purposes of the present invention, the definitions of the ranges always comprise the extremes, unless otherwise specified.

Patent application WO 2014/025561 describes a process for recovering a catalyst by hydrocracking from an effluent coming from a slurry hydrocracking area. This process provides that the effluent be separated into a first stream containing solvent and a clarified product (pitch), and a second stream containing pitch and catalyst.

The separation can be effected by centrifugation, filtration, decanting or electrostatic separation. The second stream is treated by leaching with acid so as to extract the catalyst and form an aqueous solution and a residue. The aqueous solution is then treated with anions to form an insoluble salt, the catalyst, and a further aqueous solution.

US 2013/0247406 describes a process that integrates an upgrading process of heavy crude oils to convert them into lighter products in the presence of a catalyst; a deoiling process in which the heavy residues and heavier products deriving from the treatment of the heavy crude oils are separated from the exhausted catalyst which is subsequently recovered; and a synthesis area of the catalyst.

The separation of the catalyst is effected through treatment with membrane filtration technologies, and a subsequent thermal devolatilization step.

U.S. Pat. No. 8,470,251 describes a process for the treatment of crude oils by means of hydroconversion, wherein a slurry stream coming from hydrocracking is treated under vacuum in a first distillation column, forming three fractions among which a first residue having a boiling point higher than 450° C. (pitch). This residue is subsequently treated in a second distillation column under vacuum to remove the content of Heavy Vacuum Gas Oil (HVGO) up to a maximum of 14% by weight, thus forming a second residue (pitch) which is sent for granulation.

WO 2009/070778 describes a method for the recovery of metals of an exhausted catalyst used in a slurry process for upgrading heavy oils. According to WO 2009/070778, the phase containing the exhausted catalyst is subjected to pyrolysis and the pyrolysis residue is put in contact with a leaching solution containing ammonia and with air, in order to dissolve the metals of groups VIB and VIII, and form a pressurized slurry. Said slurry contains at least one soluble metal complex of group VIB and VIII, ammonium sulfate and a solid residue containing at least one metal complex of the group VB and coke.

The residual solid containing ammonium metavanadate and coke from the pressurized slurry is subsequently separated and removed. A portion of the metals of group VIII is precipitated. The precipitation is carried out at a pre-established pH for selectively precipitating a portion of the complexes of metals of groups VIB and VIII.

US 2010/0122938 relates to a process for separating ultrafine hydrocracking solid catalysts, present in a quantity ranging from 5% to 40% by weight, from a liquid slurry of hydrocarbons. The slurry is cooled to a temperature ranging from 55° C. to 75° C., and mixed with a solvent in a solvent/slurry weight ratio ranging from 3:1 to 1:3, to form a first mixture containing liquid hydrocarbons, solvent and a stream containing the heavy hydrocarbon that encapsulates the solid of the catalyst. The first mixture is subjected to centrifugation to form a second mixture containing a low concentration of heavy hydrocarbon that encapsulates the solid of the catalyst, and a third mixture containing heavy hydrocarbon that encapsulates the solid of the catalyst. The second mixture is centrifuged to form a fourth mixture containing solvent and liquid hydrocarbons, and a fifth mixture containing a significant concentration of heavy hydrocarbon that encapsulates the solid of the catalyst. The mixtures are then joined and subjected to drying to form a mixture of hydrocarbons containing some impurities in vapour phase and a solid coke-type residue. These impurities are separated from the hydrocarbons and recovered as solid residue.

U.S. Pat. No. 7,790,646 describes a process for converting fine catalysts, present in a quantity ranging from 5 to 40% by weight, and contained in a slurry stream together with heavy oils, into coke-type materials, from which the metals of the catalyst are then recovered. The process comprises the following steps. A slurry containing heavy oils and an exhausted catalyst, containing sulfides of metals of groups VIII and VI, is mixed with a solvent, preferably in a volumetric ratio ranging from 0.5/1 to 5/1, preferably at a temperature ranging from 25° C. to 80° C., thus causing the asphaltenes to precipitate.

The exhausted catalyst and asphaltenes are separated, preferably by decanting and/or centrifugation, so as to precipitate the heavy oils and separate them from the solvent. The precipitated asphaltenes are converted into coke-type materials containing metals which are recovered by thermal pyrolysis.

EP 2440635 describes a process for recovering metals from a stream rich in hydrocarbons and carbonaceous residues. Said stream is sent to a primary treatment, effected in one or more steps, in the presence of a fluxing agent in an appropriate apparatus, at a temperature ranging from 80° C. to 180° C. and subjected to a liquid/solid separation to obtain a clarified product consisting of liquids and a cake. The cake is optionally dried to remove the hydrocarbon component which has a boiling point lower than a temperature ranging from 300° C. to 350° C. from a cake. The cake, optionally dried, is sent to a secondary thermal treatment which comprises a flameless pyrolysis at a temperature ranging from 400° C. to 800° C.; a subsequent oxidation of the pyrolysis residue is carried out under oxidation conditions and at a temperature ranging from 400° C. to 800° C.

The objective of the present invention is to separate the asphaltenes that aggregate and settle together with the solids present, from refinery purge streams.

The object of the present invention therefore relates to a method for the physical separation of asphaltenes with a conversion degree higher than or equal to 90% and solids present in refinery purge streams. Said method comprises the following steps:

heating a refinery purge stream to a temperature higher than or equal to 185° C. and not exceeding 220° C. and, subsequently, subjecting said heated purge to static sedimentation by progressively lowering the temperature in a controlled manner to a minimum temperature of 100° C., so as to form a light phase and a heavy phase defined in relation to their density.

During the controlled lowering of the temperature, the purging stratification through the formation of two phases is observed, characterized by a different density and viscosity. The denser or heavier phase is called "cake" and the less dense or lighter phase is called "clarified product". The heavy phase naturally always stratifies in the lower part beneath the light phase.

The purge produced in the refinery has the following characteristics. Metals and solids (THF-insoluble) can be present in a high concentration. Asphaltenes can be present with a conversion degree higher than or equal to 90% in high concentrations.

The high viscosity and low stability of the purge make it necessary to operate at high temperatures (higher than or equal to 220° C.) so that it can be moved and supplied to users (pitch for cement works, gasification). The characteristics indicated above make the purge a product with a much lower value than that of fuel oil or fuel for marine transportation (commercially known as ATZ bunker).

Although the purge contains metals, their concentration is not sufficient for making its delivery for metal recovery economically sustainable. The purge is typically used either as liquid fuel for cement works or it is fed in a low percentage in the charge to gasification.

Both of these uses result in a loss in yield of the hydroconversion process equal to the percentage of purge used, calculated with respect to the charge fed, typically from 5% to 10% by weight.

The method object of the present patent application, on the other hand, allows the low stability of the purge to be exploited as this characteristic facilitates physical separation by the controlled lowering of the temperature leading to the separation of two phases: cake and clarified product.

In the present patent application, the term "clarified product" refers to a hydrocarbon residue free of solids and metals, with a content of asphaltenes lower than that initially present in the purge, and already fluid at temperatures within the range of 100° C. to 160° C.

In the present patent application, the term "cake" refers to a solid at room temperature with characteristics that make it easy to grind and therefore transportable even for long distances without requiring any particular thermostat-regulation. This feature remains up to temperatures that vary within the range of 50° C. to 60° C.

The method, object of the present patent application offers the advantage of concentrating metals and solids in the cake.

The cake produced can be used as solid fuel for boilers, cement plants and steel works, or it can be sent to treatment for the recovery of the metals.

The method, object of the present patent application, also offers the advantage of recycling the clarified product in the charge to a hydroconversion process, thus maximizing the conversion itself. The clarified product can also be used in a mixture as ATZ Bunker Oil or as gasification charge.

In short, the invention, object of the present patent application, allows the purge coming from refinery processes to be upgraded.

The present invention also allows the use of relatively bland operating conditions in terms of temperature, which does not exceed 220° C., and also in terms of pressure, which is lower than 6 bars. The method described and claimed is therefore carried out in a simple apparatus which comprises a settler and a cochlea.

Further objectives and advantages of the present invention will appear more evident from the following description and attached figures, provided for purely illustrative and non-limiting purposes, which represent preferred embodiments of the present invention.

DETAILED DESCRIPTION

Figure 1:
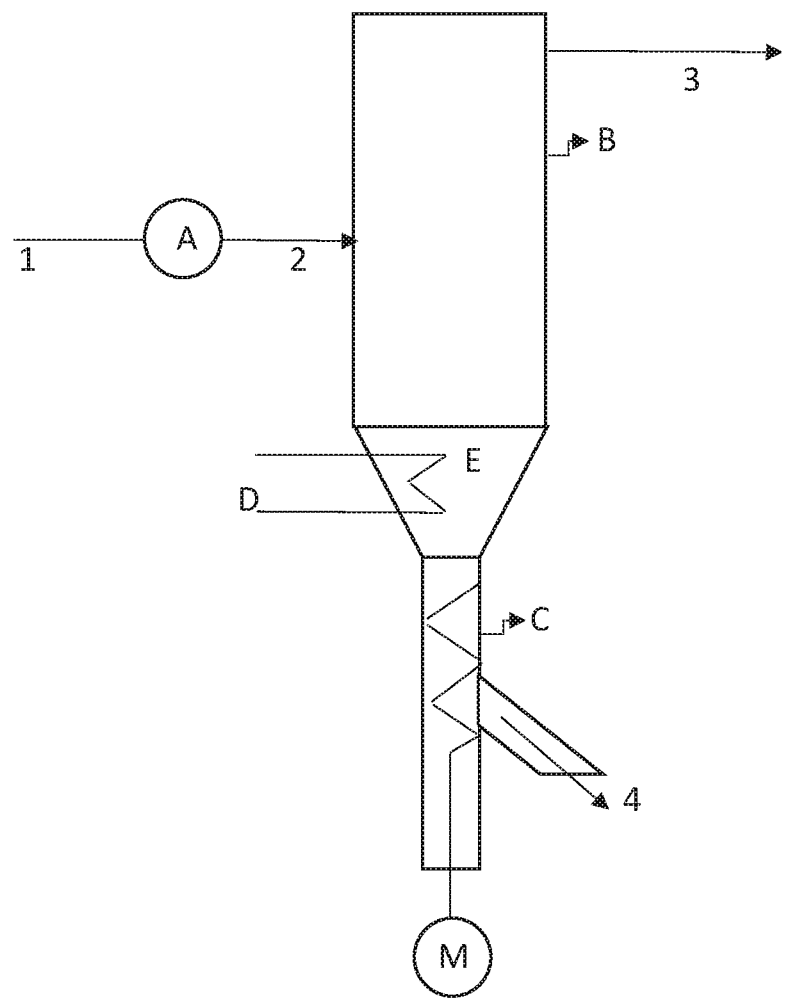
FIG. 1 illustrates a preferred embodiment of the present invention. In the block diagram, (A) and (D) are heat exchange devices, (B) is a settler, (C) is a cochlea, (M) is a motor, (1) is a refinery purge stream, (2) is a heated purge stream, (3) is a clarified stream, (4) is the dense/solid phase separated.
Figure 2:
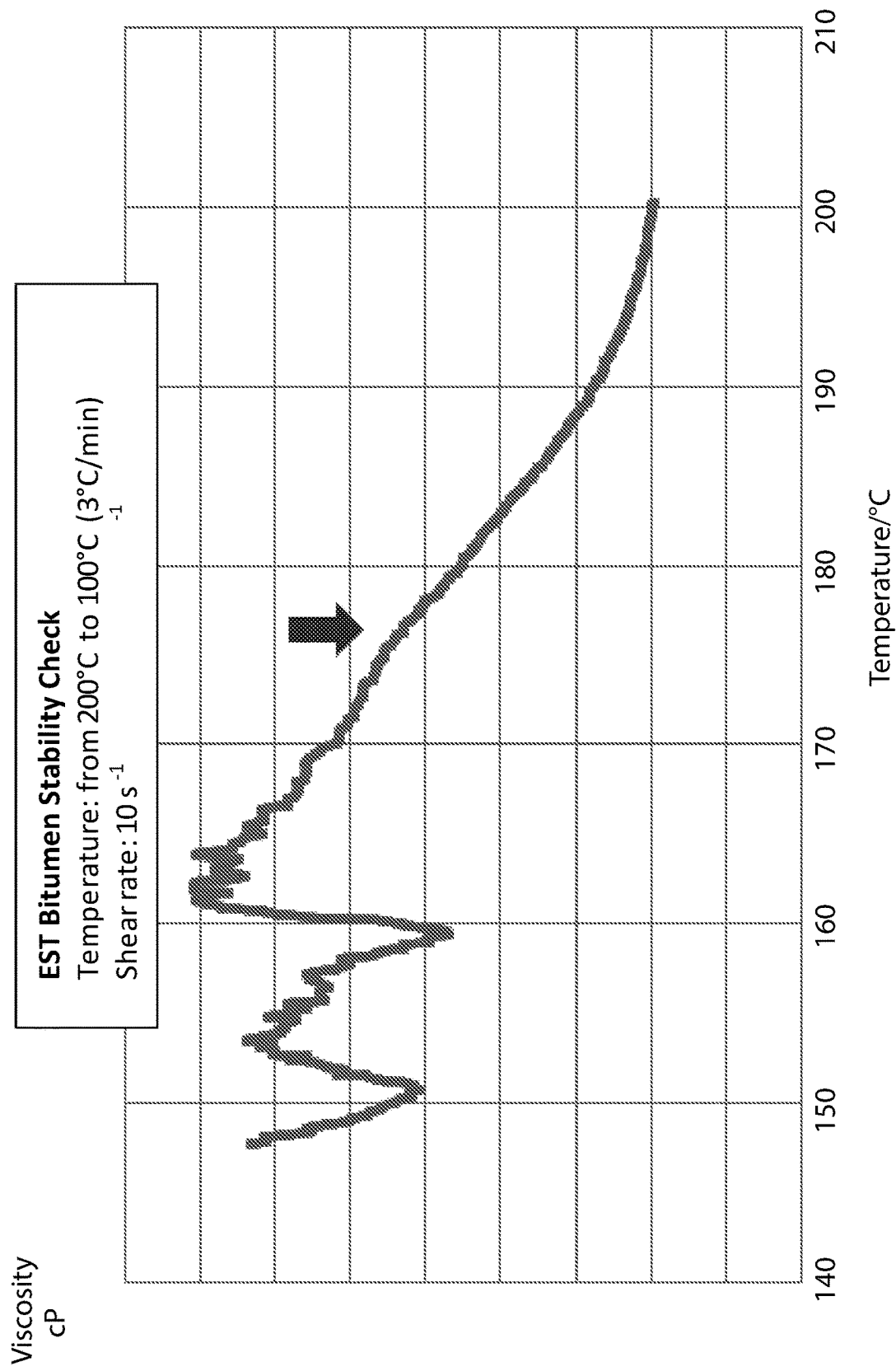
FIG. 2 shows the behaviour of a refinery purge subjected to cooling; an anomalous trend of the viscosity curve in relation to the temperature is observed below a certain temperature.

The method, object of the present patent application is now described in detail, with particular reference to FIG. 1.

The object of the present invention relates to a method for the physical separation of solids and asphaltenes with a conversion degree higher than or equal to 90% present in refinery purge streams. Said method comprises the following steps:

heating a refinery purge stream at a temperature higher than or equal to 185° C. and not exceeding 220° C. and, subsequently, subjecting said heated purge to sedimentation by progressively lowering the temperature in a controlled manner to a minimum temperature of 100° C., without stirring the purge, so as to form a light phase and a heavy phase in relation to their density.

In FIG. 1, a preferred application of the method according to the present invention is described. A refinery purge stream (1) is heated in a heat-exchange device (A) at a temperature higher than or equal to 185° C. and not exceeding 220° C., preferably to a temperature ranging from 190° C. to 200° C. The heated purge (2) proves to be homogeneous; the purge is said to be homogeneous when, having defined a sample with a volume V, the composition of the same and the rheological properties remain unchanged regardless of the portion of sample considered.

Once the purge (2) has been heated, it is introduced into a settler (B), whose bottom (E) is preferably heated by means of a heat-exchange device (D). The sedimentation is effected by means of a progressive and controlled lowering of the temperature, bringing the temperature of the purge to a temperature that varies within the range of 100° C. to 170° C., preferably ranging from 100° C. to 160° C., more preferably ranging from 120° C. to 150° C.

The temperature must be such as to make the asphaltenes insoluble and at the same time make the clarified part movable, allowing its extraction.

The separation of the dense phase is optimal within the temperature range of 120° C. to 150° C.

The time necessary for the formation of the heavy phase can vary from 15 minutes to 2 hours, preferably from 20 minutes to 1 hour, more preferably from 30 minutes to 45 minutes. The sedimentation rate can vary according to the composition of the purge and in any case ranges from 85 mm/hour to 150 mm/hour.

This rate is measured experimentally by monitoring the displacement of the interface between cake and clarified product in relation to the time.

A cylindrical container is used, which is filled with purge and placed in an oven at a temperature T=220° C., once brought to complete melting, the temperature of the oven is lowered to T=120-150° C.

After a pre-established time (t), the cylinder is extracted from the oven, the "clarified" phase is poured out and, once cooled, the height of the remaining dense phase is measured.

With a controlled lowering of the temperature, a heavy, denser phase (4) is formed, which in the present text is indicated with "cake". Once the cake has sedimented and consolidated, it is separated by means of a cochlea (C) positioned on the bottom. The cake is then cooled to room temperature.

During the separation, a light or clarified phase (3) is also formed, which is collected through a dip pipe positioned in the upper part of the settler (not indicated in FIG. 1). The operating temperature of the settler must be such as to allow the destabilization of the purge and at the same time allow the clarified phase to be moved. A temperature lower than 100° C. may prevent the displacement of the clarified phase.

The physical separation of the refinery purge exploits the temperature effect, whose controlled lowering to the temperatures indicated in the present text causes the deposition of the most insoluble asphaltene compounds that aggregate and settle together with the solids and heavy metals.

The clarified product is preferably recycled to a possible process upstream.

The cake produced is hard at room temperature with a softening point ranging from 80° C. to 100° C. and a degree of penetration ranging from 2 to 5 dmm (dmm indicates decimillimetres).

The softening point is the temperature at which the solid cake becomes soft and indicates the dependence of the consistency of the cake on the temperature. The degree of penetration is measured according to the method ASTM-D5-06 and expresses, in decimillimetres, the penetration of the material, at room temperature, by a needle having a known weight.

The consistency of the cake separated is due to the high concentration of asphaltene compounds and to a reduction in the content of maltenes with respect to the starting product. The clarified product, on the contrary, is enriched in maltenes and obviously has a reduced asphaltene content.

Some examples are provided hereunder for a better understanding of the invention and application scope, even if they in no way represent a limitation of the scope of the present invention.

Example

A purge sample from a refinery is placed in an oven, pressurized in nitrogen, and with a temperature T1 set at 200° C. After reaching the complete homogeneity of the sample, the Set Point of the oven is fixed at a temperature T2 lower than T1. After about 0.5 hours at the temperature T2, the supernatant or clarified liquid is removed. The heavy phase remaining on the bottom forms the "cake" phase.

The experiment simulates what happens to a purge stream from an EST plant, which is in fact at the temperature of 200° C., with a boiling point higher than or equal to 140° C., characterized by the presence of quantities of asphaltenes higher than or equal to 5% by weight and characterized by the presence of solid contents higher than or equal to 5% by weight, and is fed to a settler.

During the experimental test, the sedimentation is effected by lowering the temperature by 3° C./minute within the range of 100° C.-160° C. (T1). The mass is kept at this temperature for 30 minutes so as to form a heavy phase or cake. The results of the sedimentation are indicated in tables 1a, 1b, 1c. These represent three tests in which, with the same starting purge, the temperature T2 has been varied, in particular, 100° C., 130° C., 160° C.

The softening temperature was measured and also the degree of penetration of the cake produced for all three tests. The method ASTM-D5-06 was used for measuring the penetration degree of the sample of cake.

The method ASTM-D36 was used for measuring the softening temperature.

TABLE 1a

| T2 = 100° C. | | | | |
|---|---|---|---|---|
|  |  | PURGE | CAKE | CLARIFIED PRODUCT |
| Yield | wt/wt | 100% | 45% | 55% |
| Softening point | ° C. |  | 85 |  |
| Penetration at 25° C. | dmm |  | 6 |  |
| Sulfur | wt % | 2.9 | 3.6 | 2.9 |
| Mo | mg/kg | 2928 | 8700 | 11 |
| Ni | mg/kg | 1021 | 2850 | 32 |
| V | mg/kg | 2545 | 7760 | 29 |
| Solids | wt % | 5.9 | 12.7 | <0.1 |
| Asphaltenes | wt % | 26.4 | 33.9 | 18 |

TABLE 1b

T2 = 130° C.

|  |  | PURGE | CAKE | CLARIFIED PRODUCT |
|---|---|---|---|---|
| Yield | wt/wt | 100% | 35% | 65% |
| Softening point | ° C. |  | 105 |  |
| Penetration at 25° C. | dmm |  | 3 |  |
| Sulfur | wt % | 2.9 | 3.9 | 2.7 |
| Mo | mg/kg | 2928 | 9400 | 17 |
| Ni | mg/kg | 1021 | 3200 | 44 |
| V | mg/kg | 2545 | 8150 | 40 |
| Solids | wt % | 5.9 | 14.8 | <0.1 |
| Asphaltenes | wt % | 26.4 | 35.7 | 20.0 |

TABLE 1c

T2 = 160° C.

|  |  | PURGE | CAKE | CLARIFIED PRODUCT |
|---|---|---|---|---|
| Yield | wt/wt | 100% | 25% | 75% |
| Softening point | ° C. |  | 120 |  |
| Penetration at 25° C. | dmm |  | 2 |  |
| Sulfur | wt % | 2.9 | 4.1 | 2.7 |
| Mo | mg/kg | 2928 | 10120 | 12 |
| Ni | mg/kg | 1021 | 3600 | 41 |
| V | mg/kg | 2545 | 8850 | 31 |
| Solids (THF-i) | wt % | 5.9 | 15.4 | <0.1 |
| Asphaltenes | wt % | 26.4 | 36.1 | 25.9 |

In the tables, solids are indicated as THF-i.

The data produced in this example allow the effect of the temperature on the separation to be analyzed, with the same initial purge. Within the range of T2 from 100° C. to 160° C., it can be seen how the decrease in temperature T2 leads to higher yields in cake. In all the cases considered, it can be noted that metals and solids, together with asphaltenes, are concentrated in the heavy phase (cake). The asphaltenes having a high conversion degree, dispersed in a heavy hydrocarbon matrix, tend to separate due to the decrease in temperature, also incorporating any possible dispersed solids.

The invention claimed is:

1. A method for the physical separation of solids and asphaltenes present in a refinery purge stream, wherein the asphaltenes have a conversion degree higher than or equal to 90%, the method comprising:

heating the refinery purge stream to a temperature higher than or equal to 185° C. and not exceeding 220° C. to form a heated purge and, subsequently, subjecting said heated purge to sedimentation by progressively lowering the temperature in a controlled manner to a minimum temperature of 100° C., without stirring the purge, so as to form a light phase and a heavy phase in relation to the density.

2. The method according to claim 1, wherein the refinery purge stream comes from hydroconversion processes in slurry phase.

3. The method according to claim 1, wherein the heated purge is cooled to a temperature that varies within the range of 100° C. to 170° C.

4. The method according to claim 3, wherein the heated purge is cooled to a temperature ranging from 100° C. to 160° C.

5. The method according to claim 1, wherein the formation of the heavy phase takes from 15 minutes to 2 hours.

6. The method according to claim 5, wherein the formation of the heavy phase takes from 20 minutes to 1 hour.

7. The method according to claim 1, wherein the sedimentation takes place at a rate ranging from 85 mm/hour to 150 mm/hour.

* * * * *